US011836175B1

(12) United States Patent
Malkiel et al.

(10) Patent No.: US 11,836,175 B1
(45) Date of Patent: Dec. 5, 2023

(54) SYSTEMS AND METHODS FOR SEMANTIC SEARCH VIA FOCUSED SUMMARIZATIONS

(71) Applicant: Microsoft Technology Licensing, LLC, Redmond, WA (US)

(72) Inventors: Itzik Malkiel, Ramat Gan (IL); Noam Koenigstein, Tel Aviv (IL); Oren Barkan, Tel Aviv (IL); Jonathan Ephrath, Tel Aviv (IL); Yonathan Weill, Tel Aviv (IL); Nir Nice, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/853,273

(22) Filed: Jun. 29, 2022

(51) Int. Cl.
 *G06F 16/30* (2019.01)
 *G06F 16/33* (2019.01)
 *G06F 16/34* (2019.01)

(52) U.S. Cl.
 CPC ........ *G06F 16/3347* (2019.01); *G06F 16/345* (2019.01)

(58) Field of Classification Search
 CPC ............................ G06F 16/3347; G06F 16/345
 See application file for complete search history.

(56) References Cited

U.S. PATENT DOCUMENTS

| 11,620,320 B1* | 4/2023 | Shukla | G06F 16/3347 |
| | | | 707/692 |
| 2014/0280088 A1* | 9/2014 | Speer | G06F 16/3347 |
| | | | 707/723 |

(Continued)

FOREIGN PATENT DOCUMENTS

| CN | 102945228 A | 2/2013 |
| CN | 111144115 A | 5/2020 |

(Continued)

OTHER PUBLICATIONS

Article entitled "Self-Supervised Document Similarity Ranking via Contextualized Language Models and Hierarchical Inference", by Ginzburg et al., dated Jun. 2, 2021 (Year: 2021).*

(Continued)

*Primary Examiner* — Mahesh H Dwivedi
(74) *Attorney, Agent, or Firm* — Weaver IP L.L.C.

(57) ABSTRACT

Semantic search techniques via focused summarizations are described. For example, a search query is received for a text-based content item in a data set comprising a plurality of text-based content items. A first feature vector representative of the search query is obtained. A respective semantic similarity score is determined between the first feature vector and each of a plurality of second feature vectors. Each of the second feature vectors is representative of a machine-generated summarization of a respective text-based content item. The machine-generated summarization comprises a plurality of multi-word fragments that are selected from the respective text-based content item via a transformer-based machine learning model. A search result is provided responsive to the search query. The search result comprises a subset of the plurality of text-based content items associated with a respective second feature vector having a semantic similarity score that has a predetermined relationship with a predetermined threshold value.

20 Claims, 8 Drawing Sheets

(56) References Cited

U.S. PATENT DOCUMENTS

| | | | |
|---|---|---|---|
| 2020/0226126 A1* | 7/2020 | Zou | G06N 3/084 |
| 2021/0342399 A1* | 11/2021 | Sisto | G06N 3/04 |
| 2022/0083579 A1* | 3/2022 | Singh | G06F 18/22 |

FOREIGN PATENT DOCUMENTS

| | | |
|---|---|---|
| CN | 111339754 A | 6/2020 |
| KR | 101710010 B1 | 2/2017 |

OTHER PUBLICATIONS

Article entitled "Snippet Generation Using Textbook Corpus—An NLP Approach Based on BERT", by Moses et al., dated 2020 (Year: 2020).*

Bajaj, et al., "Long Document Summarization in a Low Resource Setting using Pretrained Language Models", In Proceedings of the 59th Annual Meeting of the Association for Computational Linguistics and the 11th International Joint Conference on Natural Language Processing: Student Research Workshop, Aug. 2, 2021, pp. 71-80.

Devlin, et al., "BERT: Pre-training of Deep Bidirectional Transformers for Language Understanding", In Repository of arXiv:1810.04805v1, Oct. 11, 2018, 14 Pages.

Ginzburg, et al., "Self-Supervised Document Similarity Ranking via Contextualized Language Models and Hierarchical Inference", In Proceedings of Findings of the Association for Computational Linguistics, Aug. 1, 2021, pp. 3088-3098.

Kazemi, et al., "Biased TextRank: Unsupervised Graph-Based Content Extraction", In Repository of arXiv:2011.01026v1, Nov. 2, 2020, 11 Pages.

Liu, et al., "PEGASUS: A State-of-the-Art Model for Abstractive Text Summarization", Retrieved From: https://ai.googleblog.com/2020/06/pegasus-state of-art-model-for.html, Jun. 9, 2020, 5 Pages.

Liu, et al., "Trans-Encoder: Unsupervised Sentence-Pair Modelling Through Self- and Mutual-Distillations", In Repository of arXiv:2109.13059v4, Mar. 13, 2022, pp. 1-18.

Mallick, et al., "Graph-Based Text Summarization Using Modified TextRank", In Proceedings of Advances in Intelligent Systems and Computing, vol. 758, Aug. 22, 2018, pp. 137-146.

Mihalcea, et al., "TextRank: Bringing Order into Texts", In Proceedings of the 2004 Conference on Empirical Methods in Natural Language Processing, Jul. 2004, 8 Pages.

Page, et al., "The Pagerank Citation Ranking: Bringing Order to the Web", In Technical Report of Stanford InfoLab, Jan. 29, 1998, 17 Pages.

Reimers, et al., "Sentence-BERT: Sentence Embeddings using Siamese BERT-Networks", In Repository of arXiv:1908.10084v1, Aug. 27, 2019, 11 Pages.

Yates, et al., "Pretrained Transformers for Text Ranking: BERT and Beyond", In Proceedings of the 44th International ACM Conference on Research and Development in Information, Jul. 11, 2021, pp. 2666-2668.

Yu, et al., "Towards High Performance Text Mining: A TextRank-based Method for Automatic Text Summarization", In International Journal of Grid and High Performance Computing, vol. 8, Issue 2, Apr. 2016, pp. 58-75.

Zhang, et al., "SentPWNet: A Unified Sentence Pair Weighting Network for Task-specific Sentence Embedding", In Repository of arXiv:2005.11347v1, May 22, 2020, 9 Pages.

Zhu, et al., "SUMDocS: Surrounding-aware Unsupervised Multi-Document Summarization", In Proceedings of the 2021 SIAM International Conference on Data Mining, Apr. 29, 2021, pp. 477-485.

Gagliardi, et al., "Semantic Unsupervised Automatic Keyphrases Extraction by Integrating Word Embedding with Clustering Methods", In Journal of Multimodal Technologies and Interaction, vol. 4, Issue 2, Jun. 19, 2020, 20 Pages.

Guo, et al., "Semantic Models for the First-Stage Retrieval: A Comprehensive Review", In Journal of ACM Transactions on Information Systems, vol. 40, Issue 4, Mar. 24, 2022, 42 Pages.

Malkiel, et al., "Recobert: A catalog language model for text-based recommendations", In Repository of arXiv:2009.13292v1, Sep. 25, 2020, 12 pages.

"International Search Report and Written Opinion Issued in PCT Application No. PCT/US23/022625", dated Jul. 20, 2023, 13 Pages.

Tang, et al., "Improving Document Representations by Generating Pseudo Query Embeddings for Dense Retrieval", In repository of arXiv:2105.03599v2, Aug. 20, 2021, 11 Pages.

Tran, et al., "Encoded Summarization: Summarizing Documents into Continuous Vector Space For Legal Case Retrieval", In Journal of Artificial Intelligence and Law, vol. 28, Jan. 25, 2020, pp. 441-467.

Zhan, et al., "RepBERT: Contextualized Text Embeddings for First-Stage Retrieval", In repository of arXiv:2006.15498v2, Jul. 20, 2020, 8 Pages.

* cited by examiner

For each multi-word fragment of the sorted subset, provide a representation of the multi-word fragment of the sorted subset as an input to the transformer-based machine learning model, the transformer-based machine learning model generating a feature vector representation of the multi-word fragment of the sorted subset ⟶ 702

Combine each feature vector generated by the transformer-based machine learning model for the sorted subset to generate the second feature vector representative of the summarization of the respective first text-based content item ⟶ 704

SYSTEMS AND METHODS FOR SEMANTIC SEARCH VIA FOCUSED SUMMARIZATIONS

BACKGROUND

Text similarity generally refers to methods of determining the degree of overlap between two portions of text. These methods are usually implemented during a search for a document to determine how well a document matches a given search query. However, these methods may also be used in other information retrieval problems such as document clustering (to match two documents and decide whether they should be in the same cluster) and the classification of documents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for semantic search techniques via focused summarizations. For example, a search query is received for a text-based content item in a data set comprising a plurality of text-based content items. A first feature vector representative of the search query is obtained. A respective semantic similarity score is determined between the first feature vector and each of a plurality of second feature vectors. Each of the second feature vectors are representative of a machine-generated summarization of a respective text-based content item of the plurality of text-based content items. The machine-generated summarization comprises a plurality of multi-word fragments that are selected from the respective text-based content item via a transformer-based machine learning model. A search result is provided responsive to the search query. The search result comprises a subset of the plurality of text-based content items associated with a respective second feature vector having a semantic similarity score that has a predetermined relationship with a predetermined threshold value.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 7 shows a flowchart of a method for generating a feature vector that is representative of a summarization of a respective text-based content item in accordance with an example embodiment

Figure 1:
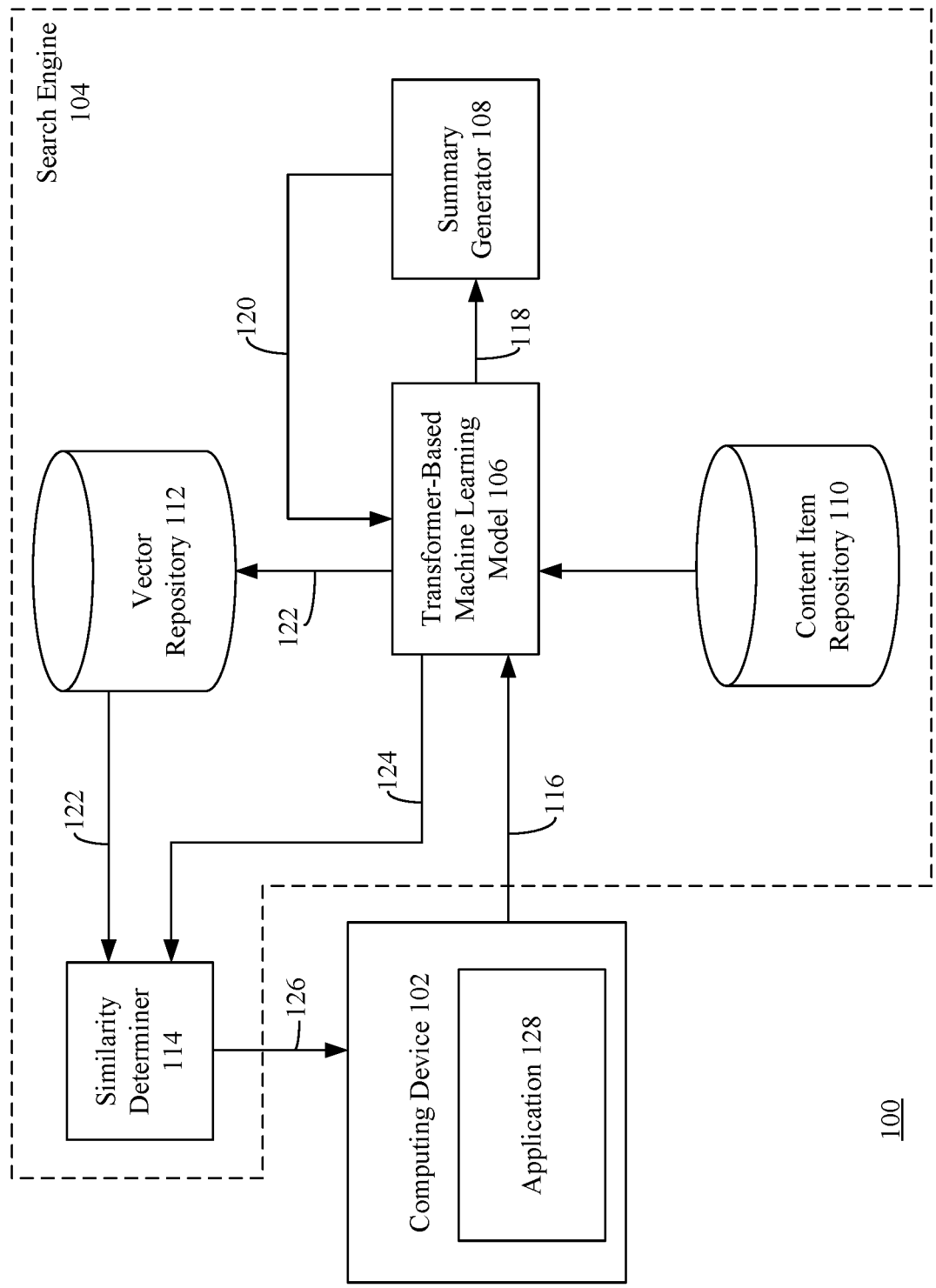
FIG. 1 shows a block diagram of a system for determining content items that are semantically similar to a search query in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The embodiments described herein are directed to semantic search techniques via focused summarizations. For example, a search query is received for a text-based content item in a data set comprising a plurality of text-based content items. A first feature vector representative of the search query is obtained. A respective semantic similarity score is determined between the first feature vector and each of a plurality of second feature vectors. Each of the second feature vectors is representative of a machine-generated summarization of a respective text-based content item of the plurality of text-based content items. The machine-generated summarization comprises a plurality of multi-word fragments that are selected from the respective text-based content item via a transformer-based machine learning model. A search result is provided responsive to the search query. The search result comprises a subset of the plurality of text-based content items associated with a respective second feature vector having a semantic similarity score that has a predetermined relationship with a predetermined threshold value.

In accordance with the embodiments described herein, the semantic similarity determined between queries and content items is determined based on a focused summarization thereof. In particular, a summary of each of the content items is generated, where each summary comprises a subset of multi-word fragments (e.g., sentences) of a corresponding content item. Furthermore, each summary is represented as a single feature vector. Similarly, search queries are also represented as feature vectors. Accordingly, the semantic similarity determination is based on an analysis of the feature vectors instead of the typical long representations of the content items. Accordingly, the amount of compute resources (e.g., processing cycles, memory storage, power, etc.) required to perform the semantic similarity determination according to the embodiments described herein is far less than compared to conventional techniques, in which the analysis is performed on relatively large content items (e.g., long documents comprising a large amount of text).

In addition, in accordance with the embodiments described herein, the summarizations are generated by a transformer-based machine learning model that is trained via sampling of inter-and-intra content item multi-word fragments (which are fragment pairs from either the same or different content item). It has been observed that such a training technique results in an improved quality of summarization (a summarization that includes more relevant multi-word fragments). As such, more accurate search results are provided responsive to a search query for such content items.

For instance, FIG. 1 shows a block diagram of a system 100 for determining content items that are semantically similar to a search query in accordance with an example embodiment. As shown in FIG. 1, system 100 includes a computing device 102 and a search engine 104 configured to return content items responsive to receiving a search query. Search engine 104 may comprise a transformer-based machine learning model 106, a summary generator 108, a content item repository 110, a vector repository 112, and/or a similarity determiner 114. It is noted that one or more of transformer-based machine learning model 104, summary generator 108, content item repository 110, vector repository 112, and/or similarity determiner 114 may not be incorporated as part of search engine 104. One or more of computing device 102 transformer-based machine learning model 106, summary generator 108, content item repository 110, vector repository 112, and/or similarity determiner 114 may be communicatively coupled via one or more networks. Examples of network(s) include, but are not limited to, a local area network (LAN), a wide area network (WAN), a personal area network (PAN), and/or a combination of communication networks, such as the Internet.

As also shown in FIG. 1, computing device 102 may comprise an application 128 executing thereon. Application 128 may enable a user to submit search queries (e.g., search query 116) utilized to issue a search for one or more content items. Examples of application 128 include, but are not limited to, a browser application (e.g., Microsoft Edge®, Mozilla Firefox®, Google® Safari®, etc.), an email application (e.g., Outlook®, Gmail®, etc.), a media streaming application (e.g., Netflix®, Amazon Prime® Video, HBO Max™ Spotify®, etc.), a voice assistant application (e.g., Amazon Alexa®, Google® Assistant™ etc.), a video sharing application (e.g., YouTube®, etc.), a social media platform application (e.g., Facebook®, Twitter®, etc.), or any other software application that enables a user to submit queries and receive search results for content items. Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer.

Content item repository 110 is configured to store a plurality of content items. Examples of content items include, but are not limited to, Web pages, text files, audio files, image files, video files, emails, and/or text-based descriptions thereof etc. The text-based descriptions may comprise a summary that describes a particular content item, such as a video file, an audio file, or an image file. Content item repository 110 may be stored in any type of physical memory and/or storage device (or portion thereof) that is described herein, and/or as would be understood by a person of skill in the relevant art(s) having the benefit of this disclosure.

Transformer-based machine learning model 106 may be utilized to generate vector-based summarizations of content items stored in content item repository 110. For instance, for each content item (and/or textual descriptions thereof) stored in content item repository, transformer-based machine learning model 106 may generate a feature vector 118 for each of a plurality of multi-word fragments that make up the content item (and/or textual descriptions thereof). Each multi-word fragment may compromise a complete sentence included in the content item (and/or textual description thereof). However, it is noted that the embodiments described herein are not so limited and that multi-word fragments may comprise a portion of a sentence (e.g., a phrase), a group of sentences, a paragraph, a group of paragraphs, etc.

To generate a feature vector 118, a representation of each of the plurality of multi-word fragments may be provided to transformer-based machine learning model 106. The representation may be a feature vector representative of the multi-word fragment. For instance, features (e.g., words) may be extracted from the multi-word fragment and such features may be utilized to generate the feature vector. The feature vectors may take any form, such as a numerical, visual and/or textual representation, or may comprise any other suitable form and may be generated using various techniques, such as, but not limited to, keyword featurization, semantic-based featurization, bag-of-words featurization, and/or n-gram-TF-IDF (term frequency-inverse document frequency) featurization.

In accordance with an embodiment, transformer-based machine learning model 106 is based on a self-supervised machine learning algorithm. The self-supervised machine learning algorithm (1) optimizes a masked language model (e.g., BERT (Bidirectional Encoder Representations from Transformers), Longformer, RoBERTa, etc.) that allows it to specialize in a given dataset (e.g., the content items stored in content item repository 110); and (2) optimizes a contrastive loss objective, which encourages multi-word fragments from the same content item have a cosine similarity of one and encourages multi-word fragments from different content items to have a cosine similarity of zero. Additional details regarding training transformer-based machine learning model 106 are provided below with respect to FIGS. 3 and 4.

For each content item (or text-based description thereof), summary generator 108 may determine the most relevant feature vectors of feature vectors 118 that were generated for the content item. The most relevant feature vectors may correspond to multi-word fragments of the content item that are uniquely descriptive of the content item. As will be described below, summary generator 108 may determine a semantic similarity between feature vectors 118 and determine an importance of the feature vectors based on the determined semantic similarities. The most relevant feature vectors (shown as relevant feature vectors 120) may be provided to transformer-based machine learning model 106. Transformer-based machine learning model 106 may generate a feature vector 122 (e.g., a single feature vector) that is representative of relevant feature vectors 120. Feature vector 122 is stored in vector repository 112.

Vector repository 112 is configured to store a plurality of feature vectors 120, each being representative of a summary of a respective content item stored in content item repository 120. Vector repository 112 may be stored in any type of physical memory and/or storage device (or portion thereof) that is described herein, and/or as would be understood by a person of skill in the relevant art(s) having the benefit of this disclosure.

Using application 128, a user may submit a search query 116 for one or more content items stored in content item repository 110. Search query 116 may be received by search engine 104, which provides a representation of search query 116 to transformer-based machine learning model 106. Transformer-based machine learning model 106 may be configured to generate a feature vector 124 representative of search query 116.

The representation of search query 116 provided to transformer-based machine learning model 106 may be a feature vector representative of search query 116. For instance, features (e.g., words) may be extracted from search query 116 and such features may be utilized to generate the feature vector. The feature vectors may take any form, such as a numerical, visual and/or textual representation, or may comprise any other suitable form and may be generated using various techniques, such as, but not limited to, keyword featurization, semantic-based featurization, bag-of-words featurization, and/or n-gram-TF-IDF (term frequency-inverse document frequency) featurization.

Similarity determiner 114 may determine a semantic similarity between feature vector 124 (representative of search query 116) and feature vectors 122 (representative of summarizations of content items stored in content item repository 110) stored in vector repository 112. Similarity determiner 114 may determine one or more of feature vectors 122 that are the most semantically similar to feature vector 124. For example, similarity determiner 114 may determine whether a respective semantic similarity score determined between feature vectors 122 and feature vector 124 has a predetermined relationship with a predetermined threshold value. For instance, similarity determiner 114 may determine whether a respective semantic similarity score reaches and/or exceeds a predetermined threshold value. Content item(s) corresponding to feature vector(s) 122 being associated with semantic similarity scores having the predetermined relationship with the predetermined threshold may be returned to application 128 via one or more search results 126. In another example, content item(s) corresponding to feature vector(s) 122 that are associated with the N highest semantic similarity scores (where N is a positive integer) may be returned to application 128 via one or more search results 126. In accordance with an embodiment, each of the semantic similarity scores may be based on a cosine similarity between feature vector 124 and a respective feature vector of feature vectors 122. Each of feature vectors 122 may be stored in a matrix. The scoring process may be implemented in real time and may require a single operation, which calculates the cosine between feature vector 124 and each of feature vectors 122 stored in the matrix. This operation may be implemented via a central processing unit (CPU) or a graphics processing unit (GPU), allowing system 100 to rank the content items in an online manner or apply fast retrieval techniques that can boost the retrieval time of content items.

Figure 2:
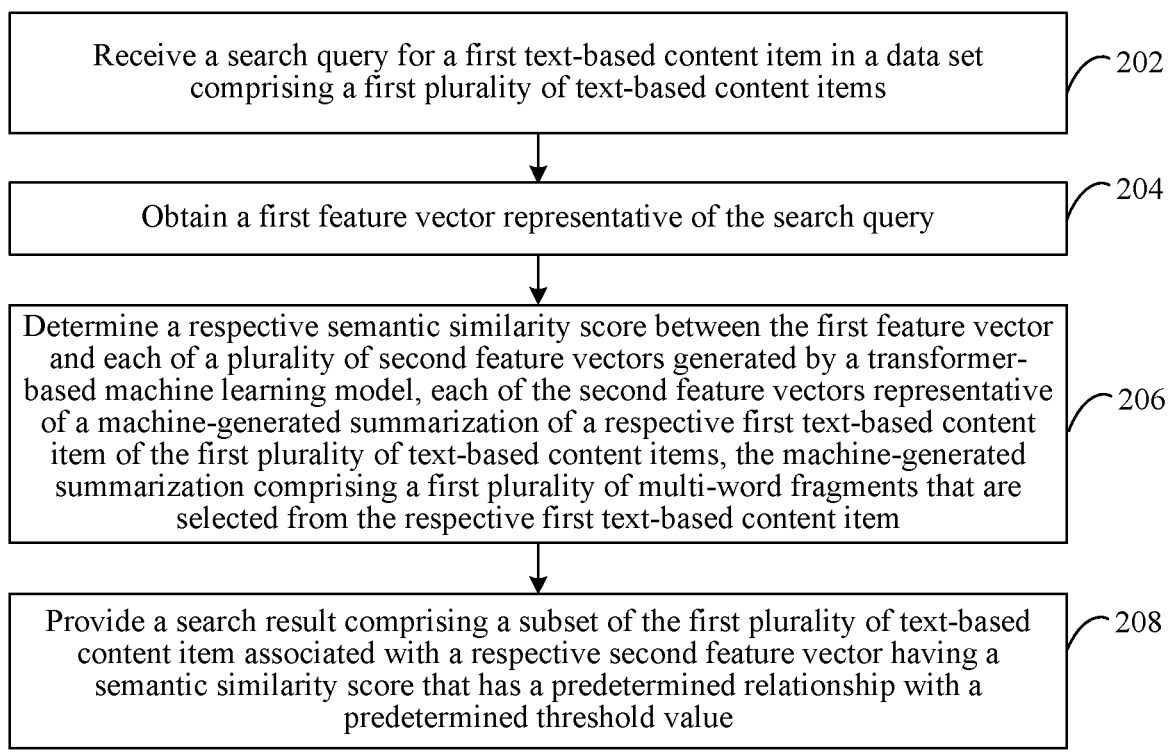
FIG. 2 shows a flowchart of a method for determining content items that are semantically similar to a search query in accordance with an example embodiment.

Accordingly, content items that are semantically similar to a search query may be determined in many ways. For instance, FIG. 2 shows a flowchart 200 of a method for determining content items that are semantically similar to a search query in accordance with an example embodiment. In an embodiment, flowchart 200 may be implemented by system 100, as described in FIG. 1. Accordingly, flowchart 200 will be described with continued reference to FIG. 1. Other structural and operational embodiments will be apparent to persons skilled in the relevant art(s) based on the following discussion regarding flowchart 200 and system 100.

As shown in FIG. 2, the method of flowchart 200 begins at step 202. At step 202, a search query for a first text-based content item in a data set comprising a first plurality of text-based content items is received. For example, with reference to FIG. 1, search engine 104 receives search query 116 for text-based content items in content item repository 110.

At step 204, a first feature vector representative of the search query is obtained. For example, with reference to FIG. 1, transformer-based machine learning model 106 generates feature vector 118, which is representative of search query 116.

In accordance with one or more embodiments, the first feature vector representative of the search query comprises providing a representation of the search query as an input to the transformer-based machine learning model, the transformer-based machine learning model generating the first feature vector based on the representation of the search query. For example, with reference to FIG. 1, search engine 104 (or a component thereof, such as a featurizer) may generate a representation of search query 116 (e.g., a feature vector based on words included in search query 116), and the representation of search query 116 may be provided to transformer-based machine learning model 106. Transformer-based machine learning model 106 may generate feature vector 124 representative of search query 116 based on the feature vector representative of search query 116 that is input into transformer-based machine learning model 106.

At step 206, a respective semantic similarity score between the first feature vector and each of a plurality of second feature vectors generated by a transformer-based machine learning model is determined. Each of the second feature vectors are representative of a machine-generated summarization of a respective first text-based content item of the first plurality of text-based content items. The machine-generated summarization comprises a first plurality of multi-word fragments that are selected from the respective first text-based content item. For example, with reference to FIG. 1, similarity determiner 114 determines a semantic similarity score between first feature vector 124 and second feature vectors 122. Each of second feature vectors 122 are representative of a machine-generated summarization of a respective text-based content item of content item repository 110 that is generated by transformer-based machine learning model 106. The machine-generated summarization comprises a first plurality of multi-word fragments that are selected from the respective text-based content item. Additional details regarding generating summarizations are provided below with reference to FIGS. 5 and 6.

At step 208, a search result comprising a subset of the first plurality of text-based content items associated with a respective second feature vector having a semantic similarity score that has a predetermined relationship with a predetermined threshold value is provided. For example, with reference to FIG. 1, similarity determiner 114 provides search result 126 comprising a subset of the first plurality of text-based content items of content item repository 110 that are associated with a respective second feature vector 122 having a semantic similarity score that has a predetermined relationship with a predetermined threshold value.

Figure 3:
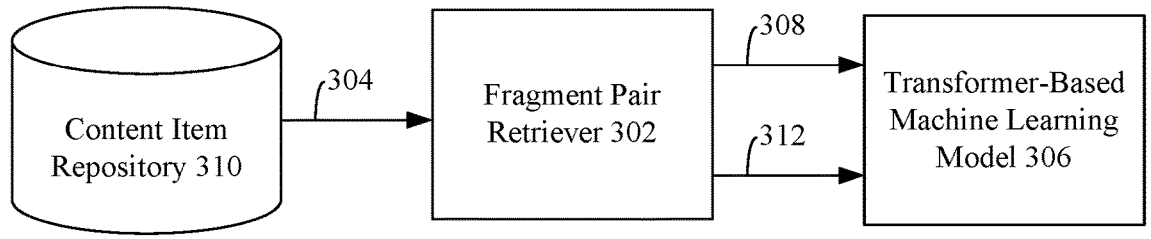
FIG. 3 shows a block diagram of a system for training a transformer-based machine learning model in accordance with an example embodiment.

FIG. 3 shows a block diagram of a system 300 for training a transformer-based machine learning model in accordance with an example embodiment. As shown in FIG. 3, system 300 comprises a content item repository 310, a transformer-based machine learning model 306, and a fragment pair retriever 304. Content item repository 310 is an example of content item repository 110 and may store the same content items stored in content item repository 110; although it is noted that the embodiments described herein are not so limited. Transformer-based machine learning model 306 is an example of transformer-based machine learning model 106, as described above with reference to FIG. 1.

In accordance with an embodiment, transformer-based machine learning algorithm 302 is a RoBERTa-based machine learning algorithm. However, as described below, training solely relies on negative and positive multi-word fragment pairs produced by inter- and intra-content item sampling, respectively.

For example, fragment pair retriever 304 is configured to retrieve content items 304 from content item repository 310. For each content item 304 retrieved, fragment pair retriever 302 may determine a plurality of first multi-word fragment pairs 308 from within content item 304 (such pairs are referred herein as intra-samples). Such fragment pairs may be obtained from within the same paragraph of a respective content item. Fragment pairs 308 may be considered as positive samples, as they are likely to be semantically similar. Fragment pairs 308 are provided as a first input to transformer-based machine learning model 306.

Fragment pair retriever 302 is also configured to obtain second multi-word fragment pairs 312 (such pairs are referred herein as inter-samples), where a first multi-word fragment of a respective fragment pair is from a first content item of content items 308 and a second multi-word fragment of a respective fragment pair is from a second content item of content items 304 that is different than the first content item. Fragment pairs 312 may be considered as negative samples, as they are likely to be not semantically similar. Fragment pairs 312 are provided as a second input to a machine learning model (e.g., transformer-based machine learning model 306). Fragment pair retriever 302 may be further configured to tokenize each multi-word fragment in pairs 308 and 312, aggregated into batches, and randomly mask words in each multi-word fragment in pairs 308 and 312 in a similar way to the RoBERTa pre-training paradigm. Masked fragment pairs 308 may be provided as a first input to transformer-based machine learning model 306, and masked fragment pairs 312 may be provided as a second input to transformer-based machine learning model 306. During training, transformer-based machine learning model 306 learns to predict the words that were masked.

The objective of such training is a dual-term loss. The first term is the standard masked-language modeling (MLM) loss (denoted as $L_{MLM}$). The MLM loss allows machine learning model 306 to specialize in the domain of the given collection of content items 304 stored in content item repository 310. The second loss term is the contrastive loss. Given a multi-word fragment pair (p, q) propagated through transformer-based machine learning model 306, transformer-based machine learning model 306 generates a feature vector for each multi-word fragment provided thereto by average pooling the token embeddings associated with each multi-word fragment separately. The token embeddings are the output of the last encoder layer of transformer-based machine learning model 306. The contrastive loss is then applied to the pair of feature vectors (corresponding to a given fragment pair of fragment pairs 308 and 312) and aims to encourage the representations of intra-samples to become closer to each other while pushing inter-samples further away than a predefined positive margin $m \in R^+$.

Formally, the contrastive loss may be defined as follows:

$$L_c = \begin{cases} 1 - C(f_p, f_q) & y_{p,q} = 1 \\ \max(0, C(f_p, f_q) - (1-m)) & y_{p,q} = 0 \end{cases} \quad \text{(Equation 1)}$$

where $f_p$, $f_q$ are the pooled vectors extracted from the token embeddings of multi-word fragments p and q, respectively. y(p,q)=1 may indicate a positive multi-word fragment pair. The positive multi-word fragment pair may be an intra-sample pair (e.g., a multi-word fragment pair sampled from the same content item of content items 304 (e.g., from within the same paragraph of the same content item)). However, it is noted that the embodiments described herein are not so limited and that positive multi-word fragment pairs may comprise other types of multi-word fragments (including multi-word fragment pairs that are sampled from different content items (e.g., if it is known that such pairs are similar)). Y(p,q)=0 may indicate a negative multi-word fragment pair. The negative multi-word fragment pair may be an inter-sample pair (e.g., a multi-word fragment pair comprising fragments sampled from different content items of content items 304). However, it is noted that the embodiments described herein are not so limited and that negative multi-word fragment pairs may comprise other types of multi-word fragments (including multi-word fragment pairs that are sampled from the same content item (or paragraph therein) (e.g., if it is known that such a pair are not similar)). $C(f_p, f_q)$ measures the cosine similarity between $f_p$ and $f_q$ using the following Cosine function:

$$C(f_p, f_q) = \frac{f_p^T f_q}{|f_p||f_q|} \quad \text{(Equation 2)}$$

It is noted that the any contrastive loss may be utilized and that the embodiments described herein are not limited to the contrastive loss defined above in Equation 1. It is further noted that any similarity function (including a learned similarity function) may be utilized and that the embodiments described herein are not limited to the similarity function defined above in Equation 2.

It has been observed that transformer-based machine learning model 306 scores multi-word fragments in a way that is more faithful to their underlying topic and semantics. Importantly, as the inter-samples represent sentences that were randomly sampled from different content items of content items 304, it is not guaranteed that their semantics would oppose each other. Instead, it is likely that those multi-word fragments are semantically uncorrelated while obtaining some level of opposite semantics only in rare cases. Therefore, instead of pushing negative samples to completely opposite directions, the contrastive loss is leveraged in a way that encourages orthogonality between inter-samples while avoiding penalizing samples with negative scores. Hence, m (or margin value, as shown in Equation 1) may be set as follows: $m \triangleq 1$, which encourages inter-samples to have a cosine similarity that is less than or equal to 0, and do not penalize pairs with negative cosine scores.

Finally, both loss terms may be combined together yielding the total loss:

$$L_{total} = L_{MLM} + L_C \quad \text{(Equation 3)}$$

As a result of the foregoing training process, transformer-based machine learning model 306 learns contextual embeddings for words of multi-word fragments provided thereto, which are pooled (e.g., averaged) together to generate a feature vector (or sentence vector) representative of the multi-word fragment.

Figure 4:
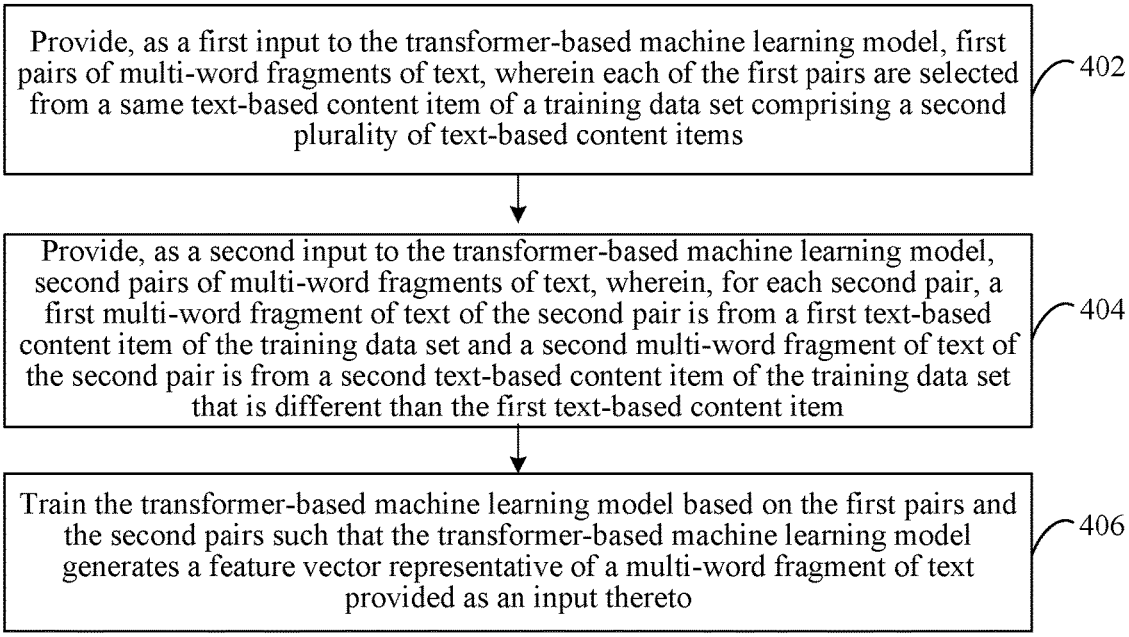
FIG. 4 shows a flowchart of a method for training a transformer-based machine learning model in accordance with an example embodiment.

Accordingly, a transformer-based machine learning model may be trained in many ways. For example, FIG. 4 shows a flowchart 400 of a method for training a transformer-based machine learning model in accordance with an example embodiment. In an embodiment, flowchart 400 may be implemented by a system 300, as shown in FIG. 3. Accordingly, flowchart 400 will be described with continued reference to FIG. 3. Other structural and operational embodiments will be apparent to persons skilled in the relevant art(s) based on the following discussion regarding flowchart 400 and system 300.

As shown in FIG. 4, the method of flowchart 400 begins at step 402. At step 402, first pairs of multi-word fragments of text are provided as a first input to a transformer-based machine learning model, each of the first pairs being selected from a same text-based content item of a training data set comprising a second plurality of text-based content items. For example, with reference to FIG. 3, fragment pair retriever 302 provides first pairs 308 of multi-word fragments of text as a first input to transformer-based machine learning model 306. Each of first pairs 308 are selected from a same text-based content item of content item repository 312.

In accordance with one or more embodiments, each of the first pairs are from within a same paragraph of the same text-based content item of the training data set. For example, with reference to FIG. 3, each of first pairs 308 are from within the same paragraph of the same text-based content item (e.g., content item 304) of content item repository 310.

At step 404, second pairs of multi-word fragments of text are provided as a second input to the transformer-based machine learning mode. For each second pair, a first multi-word fragment of text of the second pair is from a first text-based content item of the training data set and a second multi-word fragment of text of the second pair is from a second text-based content item of the training data set that is different than the first test-based content item. For example, with reference to FIG. 3, fragment pair retriever 302 provided second pairs 312 of multi-word fragments of text as a second input to transformer-based machine learning model 306. For each second pair 312, a first multi-word fragment of text of second pair 312 is from a first text-based content item 304 of content item repository 310 and a second multi-word fragment of text of the second pair is from a second text-based content item of content item repository 310 that is different than the first text-based content item.

At step 406, the transformer-based machine learning model is trained based on the first pairs and the second pairs such that the transformer-based machine learning model generates a feature vector representative of a multi-word fragment of text provided as an input thereto. For example, with reference to FIG. 3, transformer-based machine learning model 306 is trained based on first pairs 308 and second pairs 312 such that transformer-based machine learning model 306 generates a feature vector representative of a multi-word fragment of text provided as an input thereto.

Figure 5:
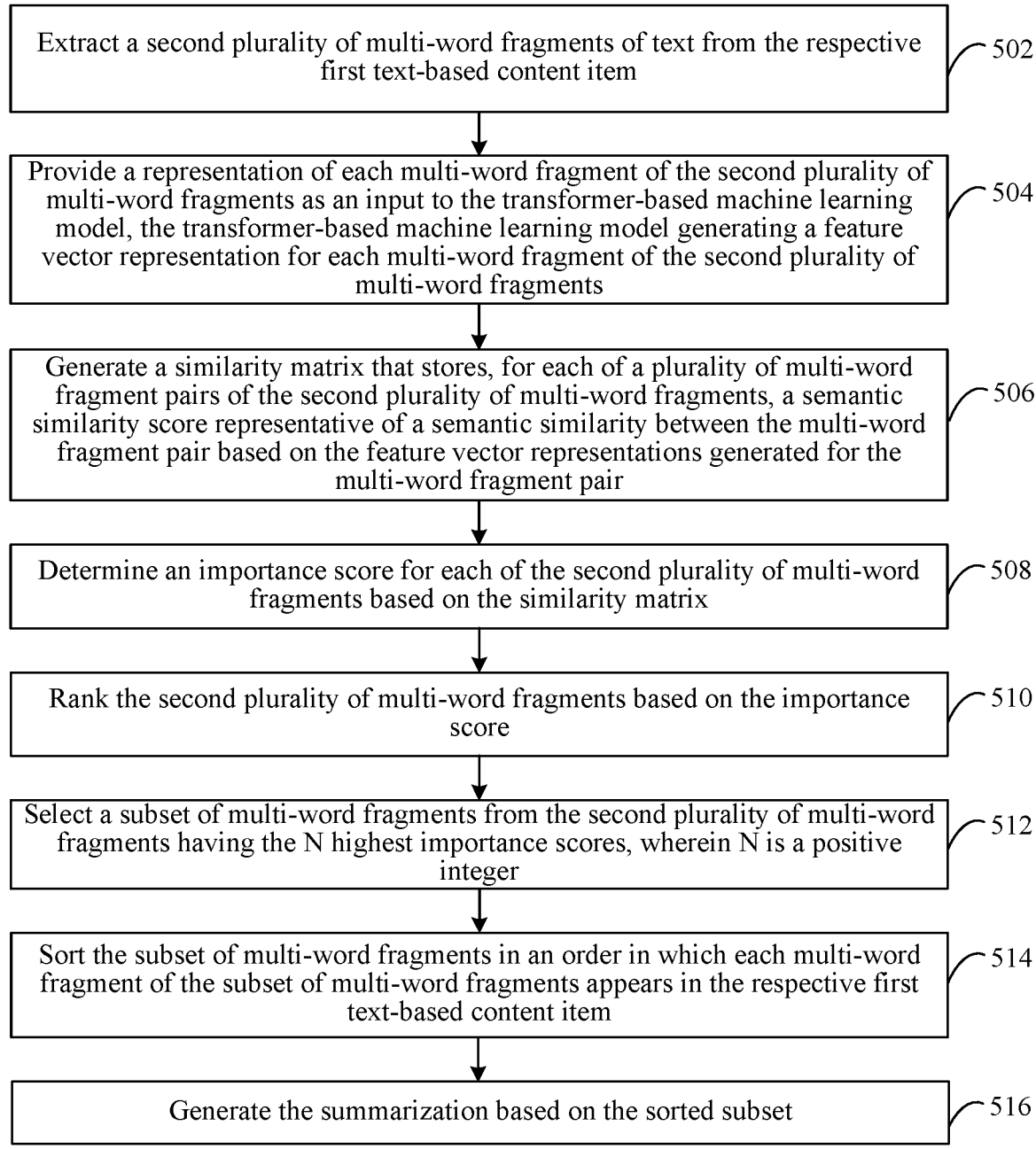
FIG. 5 shows a flowchart of a method for generating a summarization of a respective text-based content item in accordance with an example embodiment.
Figure 6:
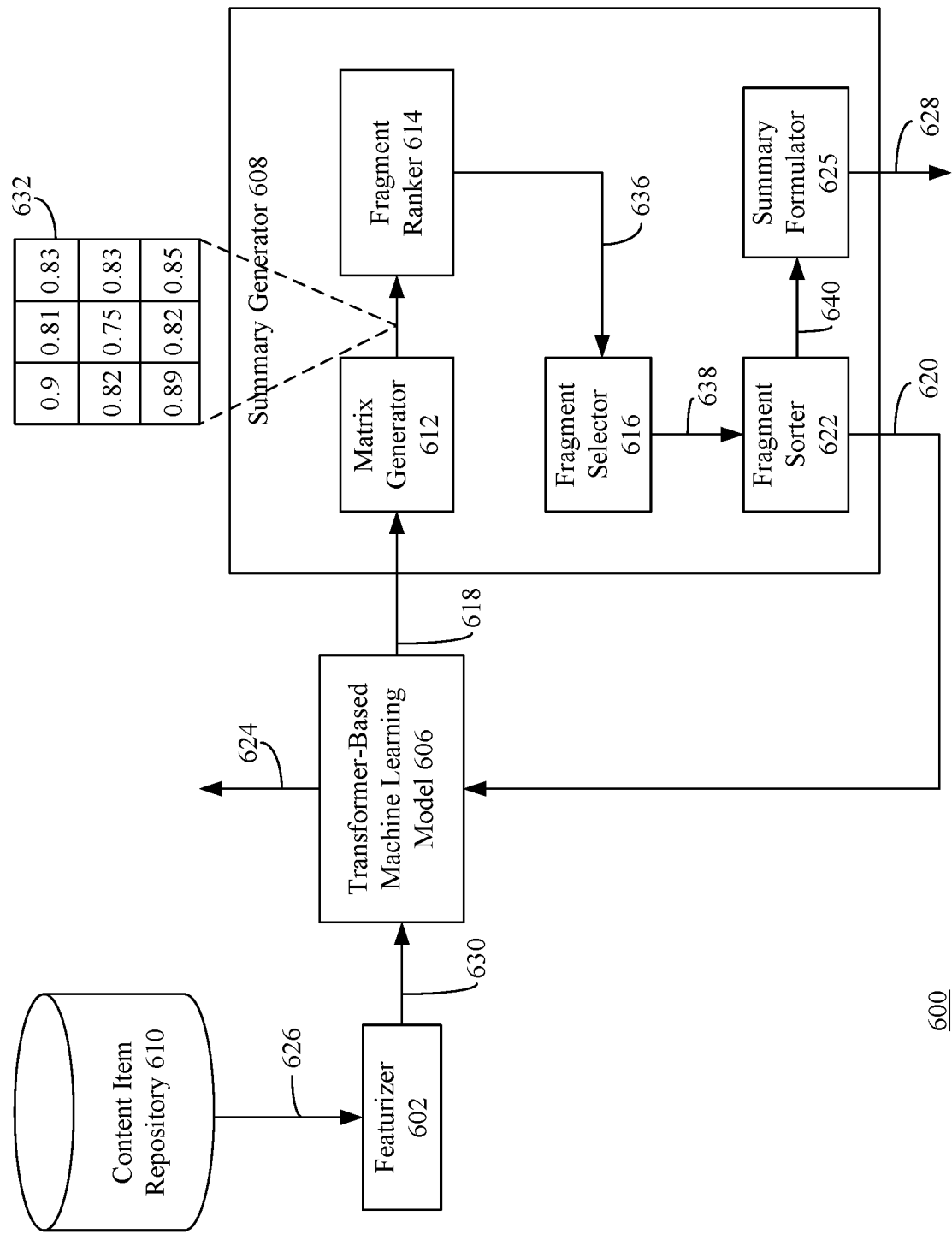
FIG. 6 shows a block diagram of system for generating a summarization of a respective text-based content item in accordance with an example embodiment.

FIG. 5 shows a flowchart 500 of a method for generating a summarization of a respective text-based content item in accordance with an example embodiment. In an embodiment, flowchart 500 may be implemented by a system 600, as shown in FIG. 6. Accordingly, flowchart 500 will be described with reference to FIG. 6. FIG. 6 shows a block diagram of system 600 for generating a summarization of a respective text-based content item in accordance with an example embodiment. As shown in FIG. 6, system 600 comprises a featurizer 602, a transformer-based machine learning model 606, a summary generator 608, and a content item repository 610. Transformer-based machine learning model 606 is an example of transformer-based machine learning model 106, as described above with reference to FIG. 1. Summary generator 608 is an example of summary generator 108, as described above with reference to FIG. 1. Content item repository 610 is an example of content item repository 110, as described above with reference to FIG. 1. Summary generator 608 includes a matrix generator 612, a fragment ranker 614, a fragment selector 616, a fragment sorter 622, and a summary formulator 625. Other structural and operational embodiments will be apparent to persons skilled in the relevant art(s) based on the following discussion regarding flowchart 500 and system 600.

As shown in FIG. 5, the method of flowchart 500 begins at step 502. At step 502, a second plurality of multi-word fragments of text is extracted from the respective first text-based content item. For example, with reference to FIG. 6, featurizer 602 extracts a second plurality of multi-word fragments of text from content items 626 retrieved from content item repository 610.

At step 504, a representation of each multi-word fragment of the second plurality of multi-word fragments is provided as an input to the transformer-based machine learning model. The transformer-based machine learning model generates a feature vector representation for each multi-word fragment of the second plurality of multi-word fragments. For example, with reference to FIG. 6, featurizer 602 is configured to generate a representation 630 of each multi-word fragment of the second plurality of multi-word fragments. The representation may be a feature vector representative of each multi-word fragment. For instance, features (e.g., words) may be extracted from each multi-word fragment and such features may be utilized to generate the feature vector. The feature vectors may take any form, such as a numerical, visual and/or textual representation, or may comprise any other suitable form and may be generated using various techniques, such as, but not limited to, keyword featurization, semantic-based featurization, bag-of-words featurization, and/or n-gram-TFIDF (term frequency-inverse document frequency) featurization. Representation 630 of each multi-word fragment is provided as an input to transformer-based machine learning model 606. Transformer-based machine learning model 606 generates a feature vector 618 for representation 630. Feature vector 618 is an example of feature vector 118, as described above with reference to FIG. 1.

At step 506, a similarity matrix is generated that stores, for each of a plurality of multi-word fragment pairs of the second plurality of multi-word fragments, a semantic similarity score representative of a semantic similarity between the multi-word fragment pair based on the feature vector representations generated for the multi-word fragment pair. For example, with reference to FIG. 6, matrix generator 612 generates a similarity matrix 632 based on feature vectors 618 generated for representations 630 of multi-word fragments of the second plurality of multi-word fragments. Similarity matrix 632 comprises a plurality of elements, each storing a respective semantic similarity score between two different multi-word fragments of the second plurality of multi-word fragments of a respective content item of content items 626. In the example shown in FIG. 6, a first element stores a semantic similarity score of 0.9 for a first pair of multi-word fragments of a particular content item (e.g., a first multi-word fragment and a second multi-word fragment of a particular content item). A second element stores a semantic similarity score of 0.81 for a second pair of multi-word fragments of the particular content item (e.g., the first multi-word fragment and a third multi-word fragment of the particular content item. A third element stores a semantic similarity score of 0.83 for a third pair of multi-word fragments of the particular content item (e.g., the first multi-word fragment and a fourth multi-word fragment of the particular content item), and so on and so forth. In the example shown in FIG. 3, the higher the semantic similarity score, the more semantically similar the multi-word fragments; although it is noted the embodiments described herein are not so limited and that other scoring techniques may be utilized.

In accordance with one or more embodiments, the semantic similarity score for a respective multi-word fragment pair of the second plurality of multi-word fragment pairs is based on a cosine similarity between the respective feature vectors representative of the respective multi-word fragment pair that are generated by the transformer-based machine learning model. In accordance with one or more embodiments, the semantic similarity score for a respective multi-word fragment pair is based on a cosine similarity between the respective feature vectors 618 of the respective multi-word fragment pair that are generated by transformer-based machine learning model 606.

At step 508, an importance score for each of the second plurality of multi-word fragments are determined based on the similarity matrix. For example, with reference to FIG. 6, fragment ranker 614 determines an importance score for each of the second plurality of multi-word fragments based on similarity matrix 632. For instance, fragment ranker 614 may be configured to implement a graph-based ranking model, such as, but not limited to TextRank. Similarity matrix 632 may be inputted into the ranking model, which outputs an importance score for each of the second plurality of multi-word fragments based on similarity matrix 632. As is known to the persons of ordinary skill in the art, graph-based ranking models typically determine vector representations (or word embeddings) of sentences of a given text. The similarities between the sentence vectors are then calculated and stored in a similarity matrix. The similarity is scored between the vectors via a standard distance function. Here, the similarity matrix (e.g., similarity matrix 632) is determined by matrix generator 612 based on feature vectors 618 generated by transformer-based machine learning model 606 (rather than being determined by computing the amount of overlap between two sentences or by using standard language understanding approaches, such as word2vec, TF-IDF, etc.). Similarity matrix 632 is then provided to the graph-based ranking model, and the graph-based ranking model converts similarity matrix 632 into a graph, with multi-word fragments being represented as vertices and the semantic similarity scores being represented as edges between the corresponding multi-word fragment vertices. The graph-based ranking model then randomly walks through the graph over a plurality of iterations to determine a number of times each of the nodes is reached. The nodes that are reached more often are indicative of relevant text-based fragments of the content item. The graph-based ranking model may output an importance score for each of the multi-word fragments based on the foregoing analysis.

At step 510, the second plurality of multi-word fragments are ranked based on the importance score. For example, as shown in FIG. 6, fragment ranker 614 ranks the importance scores (e.g., from highest to lowest, where the multi-word fragments having the relatively higher scores are deemed to be more relevant). The ranked importance scores (shown as ranked importance scores 636) are provided to fragment selector 616

At step 512, a subset of multi-word fragments is selected from the second plurality of multi-word fragments having the N highest importance scores, wherein N is a positive integer. For example, with reference to FIG. 6, fragment selector 616 may select a subset 638 of one or more multi-word fragments from the second plurality of multi-word fragments having the N highest importance scores.

At step 514, the subset of multi-word fragments is sorted in an order in which each multi-word fragment of the subset of multi-word fragments appears in the respective first text-based content item. For example, with reference to FIG. 6, fragment sorter 622 sorts subset 638 of multi-word fragments in an order in which each multi-word fragment of the subset of multi-word fragments appears in the respective first text-based content item. For instance, suppose the sentences having the 3 highest importance scores are selected for subset 638. Further suppose that the third sentence has the highest score, the first sentence has the next highest score, and the third sentence has the next highest score after the first sentence. In addition, suppose that the first sentence appears first in the respective first text-based content item, the second sentence appears after the first sentence, and the third sentence appears after the second sentence. In this example, fragment sorter 622 re-sorts the three sentences in the order in which they appear in the text-based content item, such the first sentence is the first sentence in the summary, the second sentence is the second sentence in the summary, and the third sentence is the third sentence in the summary. The sorted fragments (shown as sorted fragments 640) are provided to summary formulator 625. Fragment sorter 622 may also output the feature vectors (shown as feature vectors 620) corresponding to the multi-word fragments of sorted fragments 640). Feature vectors 620 are an example of feature vectors 120, as described above with reference to FIG. 1. As described below with reference to FIGS. 7 and 8, a single feature vector representative of feature vectors 620 may be generated.

At step 514, the summarization is generated based on the sorted subset. For example, with reference to FIG. 6, summary formulator 625 generates a summarization 628 of the content item based on sorted fragments 640. For instance, summary formulator 625 may process and/or format sorted fragments 640 such that they are in a human and/or machine-readable format and output summary 628. Summary 628 may be displayable, for example, via a web page and/or an application, such as application 128, as described above with reference to FIG. 1.

FIG. 7 shows a flowchart 700 of a method for generating a feature vector that is representative of a summarization of a respective text-based content item in accordance with an example embodiment. In an embodiment, flowchart 700 may be implemented by system 600, as shown in FIG. 6. Accordingly, flowchart 700 will be described with continued reference to FIG. 6. Other structural and operational embodiments will be apparent to persons skilled in the relevant art(s) based on the following discussion regarding flowchart 700 and system 600.

As shown in FIG. 7, the method of flowchart 700 begins at step 702. At step 702, for each multi-word fragment of the sorted subset, a representation of the multi-word fragments of the sorted subset is provided as an input to the transformer-based machine learning model, the transformer-based machine learning model generating a feature vector representation of the multi-word fragment of the sorted subset. For example, with reference to FIG. 6, for each multi-word fragment of sorted subset 640, feature vector 620 of the multi-word fragment of sorted subset 640 is provided as an input to transformer-based machine learning model 606. Transformer-based machine learning model 606 is configured to generate a feature vector representation of sorted subset 640 based on feature vector(s) 620 of sorted subset 640.

At step 704, each feature vector generated by the transformer-based machine learning model for the sorted subset is combined to generate the second feature vector representative of the summarization of the respective first text-based content item. For example, transformer-based machine learning model 606 may combine feature vector(s) 620 to generate a second (e.g., single) feature vector 624 that is representative of the summarization of the respective first text-based content item. Feature vector 624 is an example of feature vector 124, as described above with reference to FIG. 1.

III. Further Example Embodiments and Advantages

As noted above, systems and devices may be configured in various ways for semantic similarity-based searches via focused summarizations. The focused summarization techniques described herein generate more accurate summarizations for regardless of the length of such content items (e.g., documents). Such techniques are performed using self-supervised techniques that do not require any labeled data. Such techniques can be beneficial for various applications including, but not limited to, question answering, search, etc.

In accordance with an embodiment, the similarity between may documents may also be determined utilizing the techniques described herein. For instance, for each content item, a feature vector (e.g., feature vector 122) may be generated based on a summarization of the content item (as described above with reference to FIG. 1). To rank the similarity between all content items, the cosine similarity between feature vectors of all the content items may be determined and stored via a similarity matrix. The foregoing may be computed using a single operation via a CPU or GPU.

For each seed content item, all the content items may be sorted in descending order according to their similarity score, and the top K similarity scores may be retrieved as recommendations for content items that are similar to the seed content item, where K is a positive integer.

It is noted that while the embodiments described herein utilize a transformer-based machine learning model to determine feature vector representations of search queries and content items, the embodiments described herein are not so limited and that other types of machine learning models may be utilized.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Mobile and Stationary Device Embodiments

The systems and methods described above in reference to FIGS. 1-7 computing device 102, search engine 104, transformer-based machine learning model 106, summary generator 108, content item repository 110, vector repository 112, similarity determiner 114, application 128, fragment pair retriever 302, transformer-based machine learning model 306, content item repository 310, featurizer 602, transformer-based machine learning model 606, summary generator 608, and content item repository 610, and/or each of the components described therein, and/or flowcharts 200, 400, 500, and/or 700 may be implemented in hardware, or hardware combined with one or both of software and/or firmware. For example, search engine 104, transformer-based machine learning model 106, summary generator 108, similarity determiner 114, application 128, fragment pair retriever 302, transformer-based machine learning model 306, featurizer 602, transformer-based machine learning model 606, and summary generator 608, and/or each of the components described therein, and/or flowcharts 200, 400, 500, and/or 700 may be each implemented as computer program code/instructions configured to be executed in one or more processors and stored in a computer readable storage medium. Alternatively, search engine 104, transformer-based machine learning model 106, summary generator 108, content item repository 110, vector repository 112, similarity determiner 114, application 128, fragment pair retriever 302, transformer-based machine learning model 306, content item repository 310, featurizer 602, transformer-based machine learning model 606, summary generator 608, and content item repository 610, and/or each of the components described therein, and/or flowcharts 200, 400, 500, and/or 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
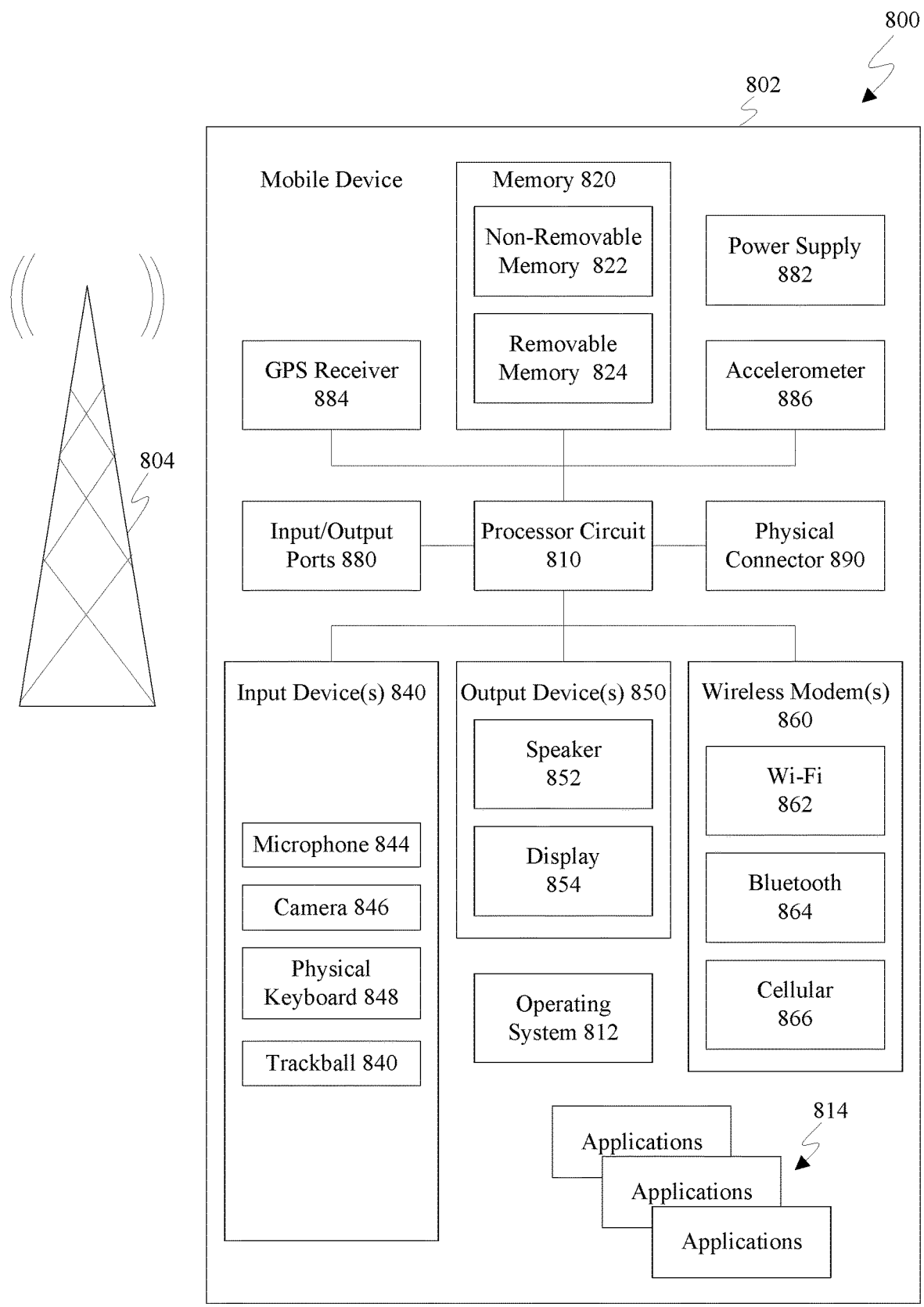
FIG. 8 is a block diagram of an exemplary user device in which embodiments may be implemented.

FIG. 8 shows a block diagram of an exemplary mobile device 800 including a variety of optional hardware and software components, shown generally as components 802. Any number and combination of the features/elements of the systems and methods described above may be implemented as components 802 included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor referred to as processor circuit 810 for performing such tasks as signal coding, image processing, data processing, input/output processing, power control, and/or other functions. Processor circuit 810 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 810 may execute program code stored in a computer readable medium, such as program code of one or more applications 814, operating system 812, any program code stored in memory 820, etc. Operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running operating system 812 and applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing the systems and methods described above, including the embodiments described in reference to FIGS. 1-7, search engine 104, transformer-based machine learning model 106, summary generator 108, similarity determiner 114, application 128, fragment pair retriever 302, transformer-based machine learning model 306, featurizer 602, transformer-based machine learning model 606, and summary generator 608, and/or each of the components described therein, and/or flowcharts 200, 400, 500, and/or 700.

Mobile device 800 can support one or more input devices 830, such as a touch screen 832, microphone 834, camera 836, physical keyboard 838 and/or trackball 840 and one or more output devices 850, such as a speaker 852 and a display 854.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between processor circuit 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). Cellular modem 866 may be configured to enable phone calls (and optionally transmit data) according to any suitable communication standard or technology, such as GSM, 3G, 4G, 5G, etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be not present and other components can be additionally present as would be recognized by one skilled in the art.

Figure 9:
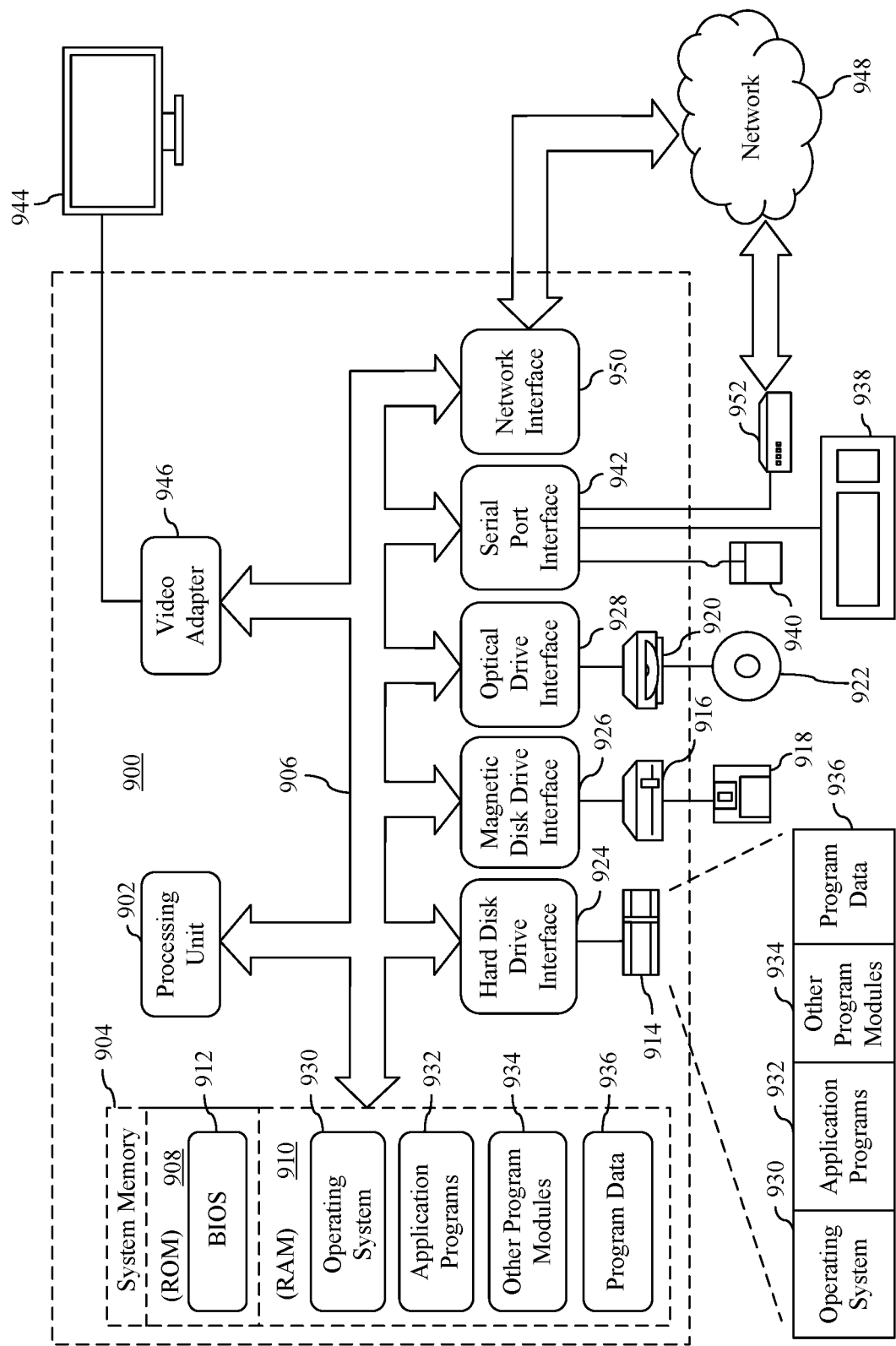
FIG. 9 is a block diagram of an example processor-based computer system that may be used to implement various embodiments.

Furthermore, FIG. 9 depicts an exemplary implementation of a computing device 900 in which embodiments may be implemented. For example, computing device 102, search engine 104, transformer-based machine learning model 106, summary generator 108, content item repository 110, vector repository 112, similarity determiner 114, application 128, fragment pair retriever 302, transformer-based machine learning model 306, content item repository 310, featurizer 602, transformer-based machine learning model 606, summary generator 608, and content item repository 610, and/or each of the components described therein, and/or flowcharts 200, 400, 500, and/or 700 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems and methods described above, including the embodiments described above with reference to FIGS. 1-7.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A system is described herein. The system comprises: at least one processor circuit; and at least one memory that stores program code that, when executed by the at least one processor circuit, performs operations. The operations include: receiving a search query for a first text-based content item in a data set comprising a first plurality of text-based content items; obtaining a first feature vector representative of the search query; determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item; and providing a search result comprising a subset of the first plurality of text-based content items associated with a respective second feature vector having a semantic similarity score that has a predetermined relationship with a predetermined threshold value.

In an implementation of the foregoing system, the operations further include: providing, as a first input to the transformer-based machine learning model, first pairs of multi-word fragments of text, wherein each of the first pairs are selected from a same text-based content item of a training data set comprising a second plurality of text-based content items; providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and training the transformer-based machine learning model based on the first pairs and the second pairs such that the transformer-based machine learning model generates a feature vector representative of a multi-word fragment of text provided as an input thereto.

In an implementation of the foregoing system, each of the first pairs are from within a same paragraph of the same text-based content item of the training data set.

In an implementation of the foregoing system, the summarization of the respective first text-based content item is generated by: extracting a second plurality of multi-word fragments of text from the respective first text-based content item; providing a representation of each multi-word fragment of the second plurality of multi-word fragments as an input to the transformer-based machine learning model, the transformer-based machine learning model generating a feature vector representation for each multi-word fragment of the second plurality of multi-word fragments; generating a similarity matrix that stores, for each of a plurality of multi-word fragment pairs of the second plurality of multi-word fragments, a semantic similarity score representative of a semantic similarity between the multi-word fragment pair based on the feature vector representations generated for the multi-word fragment pair; determining an importance score for each of the second plurality of multi-word fragments based on the similarity matrix; ranking the second plurality of multi-word fragments based on the importance score; selecting a subset of multi-word fragments from the second plurality of multi-word fragments having the N highest importance scores, wherein N is a positive integer; sorting the subset of multi-word fragments in an order in which each multi-word fragment of the subset of multi-word fragments appears in the respective first text-based content item; and generating the summarization based on the sorted subset.

In an implementation of the foregoing system, the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

In an implementation of the foregoing system, the second feature vector representative of the summarization of the respective first text-based content item is generated by: for each multi-word fragment of the sorted subset: providing a representation of the multi-word fragment of the sorted subset as an input to the transformer-based machine learning model, the transformer-based machine learning model generating a feature vector representation of the multi-word fragment of the sorted subset; and combining each feature vector generated by the transformer-based machine learning model for the sorted subset to generate the second feature vector representative of the summarization of the respective first text-based content item.

In an implementation of the foregoing system, obtaining the first feature vector representative of the search query comprises: providing a representation of the search query as an input to the transformer-based machine learning model, the transformer-based machine learning model generating the first feature vector based on the representation of the search query.

A method is also disclosed herein. The method includes: receiving a search query for a first text-based content item in a data set comprising a first plurality of text-based content items; obtaining a first feature vector representative of the search query; determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item; and providing a search result comprising a subset of the first plurality of text-based content items associated with a respective second feature vector having a semantic similarity score that has a predetermined relationship with a predetermined threshold value.

In an implementation of the foregoing method, the method further includes: providing, as a first input to the transformer-based machine learning model, first pairs of multi-word fragments of text, wherein each of the first pairs are selected from a same text-based content item of a training data set comprising a second plurality of text-based content items; providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and training the transformer-based machine learning model based on the first pairs and the second pairs such that the transformer-based machine learning model generates a feature vector representative of a multi-word fragment of text provided as an input thereto.

In an implementation of the foregoing method, each of the first pairs are from within a same paragraph of the same text-based content item of the training data set.

In an implementation of the foregoing method, the summarization of the respective first text-based content item is generated by: extracting a second plurality of multi-word fragments of text from the respective first text-based content item; providing a representation of each multi-word fragment of the second plurality of multi-word fragments as an input to the transformer-based machine learning model, the transformer-based machine learning model generating a feature vector representation for each multi-word fragment of the second plurality of multi-word fragments; generating a similarity matrix that stores, for each of a plurality of multi-word fragment pairs of the second plurality of multi-word fragments, a semantic similarity score representative of a semantic similarity between the multi-word fragment pair based on the feature vector representations generated for the multi-word fragment pair; determining an importance score for each of the second plurality of multi-word fragments based on the similarity matrix; ranking the second plurality of multi-word fragments based on the importance score; selecting a subset of multi-word fragments from the second plurality of multi-word fragments having the N highest importance scores, wherein N is a positive integer; sorting the subset of multi-word fragments in an order in which each multi-word fragment of the subset of multi-word fragments appears in the respective first text-based content item; and generating the summarization based on the sorted subset.

In an implementation of the foregoing method, the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

In an implementation of the foregoing method, the second feature vector representative of the summarization of the respective first text-based content item is generated by: for each multi-word fragment of the sorted subset: providing a representation of the multi-word fragment of the sorted subset as an input to the transformer-based machine learning model, the transformer-based machine learning model generating a feature vector representation of the multi-word fragment of the sorted subset; and combining each feature vector generated by the transformer-based machine learning model for the sorted subset to generate the second feature vector representative of the summarization of the respective first text-based content item.

In an implementation of the foregoing method, obtaining the first feature vector representative of the search query comprises: providing a representation of the search query as an input to the transformer-based machine learning model, the transformer-based machine learning model generating the first feature vector based on the representation of the search query.

A computer-readable storage medium having program instructions recorded thereon that, when executed by at least one processor, perform a method is further described herein. The method comprises: receiving a search query for a first text-based content item in a data set comprising a first plurality of text-based content items; obtaining a first feature vector representative of the search query; determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item; and providing a search result comprising a subset of the first plurality of text-based content items associated with a respective second feature vector having a semantic similarity score that has a predetermined relationship with a predetermined threshold value.

In one implementation of the computer-readable storage medium, the method further includes: providing, as a first input to the transformer-based machine learning model, first pairs of multi-word fragments of text, wherein each of the first pairs are selected from a same text-based content item of a training data set comprising a second plurality of text-based content items; providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and training the transformer-based machine learning model based on the first pairs and the second pairs such that the transformer-based machine learning model generates a feature vector representative of a multi-word fragment of text provided as an input thereto.

In one implementation of the computer-readable storage medium, each of the first pairs are from within a same paragraph of the same text-based content item of the training data set.

In one implementation of the computer-readable storage medium, the summarization of the respective first text-based content item is generated by: extracting a second plurality of multi-word fragments of text from the respective first text-based content item; providing a representation of each multi-word fragment of the second plurality of multi-word fragments as an input to the transformer-based machine learning model, the transformer-based machine learning model generating a feature vector representation for each multi-word fragment of the second plurality of multi-word fragments; generating a similarity matrix that stores, for each of a plurality of multi-word fragment pairs of the second plurality of multi-word fragments, a semantic similarity score representative of a semantic similarity between the multi-word fragment pair based on the feature vector representations generated for the multi-word fragment pair; determining an importance score for each of the second plurality of multi-word fragments based on the similarity matrix; ranking the second plurality of multi-word fragments based on the importance score; selecting a subset of multi-word fragments from the second plurality of multi-word fragments having the N highest importance scores, wherein N is a positive integer; sorting the subset of multi-word fragments in an order in which each multi-word fragment of the subset of multi-word fragments appears in the respective first text-based content item; and generating the summarization based on the sorted subset.

In one implementation of the computer-readable storage medium, the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

In one implementation of the computer-readable storage medium, the second feature vector representative of the summarization of the respective first text-based content item is generated by: for each multi-word fragment of the sorted subset: providing a representation of the multi-word fragment of the sorted subset as an input to the transformer-based machine learning model, the transformer-based machine learning model generating a feature vector representation of the multi-word fragment of the sorted subset; and combining each feature vector generated by the transformer-based machine learning model for the sorted subset to generate the second feature vector representative of the summarization of the respective first text-based content item.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system, comprising:
   at least one processor circuit; and
   at least one memory that stores program code that, when executed by the at least one processor circuit, performs operations, the operations comprising:
   receiving a search query for a first text-based content item in a data set comprising a first plurality of text-based content items;
   obtaining a first feature vector representative of the search query;
   determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item, each machine-generated summarization generated by:
   extracting a second plurality of multi-word fragments of text from the respective first text-based content item;
   determining importance scores for the second plurality of multi-word fragments based on a similarity matrix;
   ranking the second plurality of multi-word fragments based on the importance scores;
   selecting a subset of multi-word fragments from the second plurality of multi-word fragments having an N highest importance scores; and
   generating the summarization based on sorting the subset; and
   providing a search result comprising a subset of the first plurality of text-based content items associated with a respective second feature vector having a semantic similarity score that has a predetermined relationship with a predetermined threshold value.

2. The system of claim 1, the operations further comprising:
   providing, as a first input to the transformer-based machine learning model, first pairs of multi-word fragments of text, wherein each of the first pairs are selected from a same text-based content item of a training data set comprising a second plurality of text-based content items;
   providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and
   training the transformer-based machine learning model based on the first pairs and the second pairs such that the transformer-based machine learning model generates a feature vector representative of a multi-word fragment of text provided as an input thereto.

3. The system of claim 2, wherein each of the first pairs are from within a same paragraph of the same text-based content item of the training data set.

4. The system of claim 2, wherein the summarization of the respective first text-based content item is further generated by:
   providing a representation of each multi-word fragment of the second plurality of multi-word fragments as an input to the transformer-based machine learning model, the transformer-based machine learning model generating a feature vector representation for each multi-word fragment of the second plurality of multi-word fragments;
   generating the similarity matrix to store, for each of the plurality of multi-word fragment pairs of the second plurality of multi-word fragments, a semantic similarity score representative of a semantic similarity between the multi-word fragment pair based on the feature vector representations generated for the multi-word fragment pair;
   sorting the subset of multi-word fragments in an order in which each multi-word fragment of the subset of multi-word fragments appears in the respective first text-based content item; and
   wherein N is a positive integer.

5. The system of claim 4, wherein the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

6. The system of claim 4, wherein the second feature vector representative of the summarization of the respective first text-based content item is generated by:
for each multi-word fragment of the sorted subset:
providing a representation of the multi-word fragment of the sorted subset as an input to the transformer-based machine learning model, the transformer-based machine learning model generating a feature vector representation of the multi-word fragment of the sorted subset; and
combining each feature vector generated by the transformer-based machine learning model for the sorted subset to generate the second feature vector representative of the summarization of the respective first text-based content item.

7. The system of claim 2, wherein obtaining the first feature vector representative of the search query comprises:
providing a representation of the search query as an input to the transformer-based machine learning model, the transformer-based machine learning model generating the first feature vector based on the representation of the search query.

8. A method, comprising:
receiving a search query for a first text-based content item in a data set comprising a first plurality of text-based content items;
obtaining a first feature vector representative of the search query;
determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item, each machine-generated summarization generated by:
extracting a second plurality of multi-word fragments of text from the respective first text-based content item;
determining importance scores for the second plurality of multi-word fragments based on a similarity matrix;
ranking the second plurality of multi-word fragments based on the importance scores;
selecting a subset of multi-word fragments from the second plurality of multi-word fragments having an N highest importance scores; and
generating the summarization based on sorting the subset; and
providing a search result comprising a subset of the first plurality of text-based content items associated with a respective second feature vector having a semantic similarity score that has a predetermined relationship with a predetermined threshold value.

9. The method of claim 8, further comprising:
providing, as a first input to the transformer-based machine learning model, first pairs of multi-word fragments of text, wherein each of the first pairs are selected from a same text-based content item of a training data set comprising a second plurality of text-based content items;
providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and
training the transformer-based machine learning model based on the first pairs and the second pairs such that the transformer-based machine learning model generates a feature vector representative of a multi-word fragment of text provided as an input thereto.

10. The method of claim 9, wherein each of the first pairs are from within a same paragraph of the same text-based content item of the training data set.

11. The method of claim 9, wherein the summarization of the respective first text-based content item is further generated by:
providing a representation of each multi-word fragment of the second plurality of multi-word fragments as an input to the transformer-based machine learning model, the transformer-based machine learning model generating a feature vector representation for each multi-word fragment of the second plurality of multi-word fragments;
generating the similarity matrix to store, for each of the plurality of multi-word fragment pairs of the second plurality of multi-word fragments, a semantic similarity score representative of a semantic similarity between the multi-word fragment pair based on the feature vector representations generated for the multi-word fragment pair;
sorting the subset of multi-word fragments in an order in which each multi-word fragment of the subset of multi-word fragments appears in the respective first text-based content item; and
wherein N is a positive integer.

12. The method of claim 11, wherein the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

13. The method of claim 11, wherein the second feature vector representative of the summarization of the respective first text-based content item is generated by:
for each multi-word fragment of the sorted subset:
providing a representation of the multi-word fragment of the sorted subset as an input to the transformer-based machine learning model, the transformer-based machine learning model generating a feature vector representation of the multi-word fragment of the sorted subset; and
combining each feature vector generated by the transformer-based machine learning model for the sorted subset to generate the second feature vector representative of the summarization of the respective first text-based content item.

14. The method of claim 9, wherein obtaining the first feature vector representative of the search query comprises:

providing a representation of the search query as an input to the transformer-based machine learning model, the transformer-based machine learning model generating the first feature vector based on the representation of the search query.

15. A computer-readable storage medium having program instructions recorded thereon that, when executed by at least one processing circuit, perform a method, the method comprising:

receiving a search query for a first text-based content item in a data set comprising a first plurality of text-based content items;

obtaining a first feature vector representative of the search query;

determining a respective semantic similarity score between the first feature vector and each of a plurality of second feature vectors generated by a transformer-based machine learning model, each of the second feature vectors representative of a machine-generated summarization of a respective first text-based content item of the first plurality of text-based content items, the machine-generated summarization comprising a first plurality of multi-word fragments that are selected from the respective first text-based content item, each machine-generated summarization generated by:

extracting a second plurality of multi-word fragments of text from the respective first text-based content item;

determining importance scores for the second plurality of multi-word fragments based on a similarity matrix;

ranking the second plurality of multi-word fragments based on the importance scores;

selecting a subset of multi-word fragments from the second plurality of multi-word fragments having an N highest importance scores; and generating the summarization based on sorting the subset; and providing a search result comprising a subset of the first plurality of text-based content items associated with a respective second feature vector having a semantic similarity score that has a predetermined relationship with a predetermined threshold value.

16. The computer-readable storage medium of claim 15, the method further comprising:

providing, as a first input to the transformer-based machine learning model, first pairs of multi-word fragments of text, wherein each of the first pairs are selected from a same text-based content item of a training data set comprising a second plurality of text-based content items;

providing, as a second input to the transformer-based machine learning model, second pairs of multi-word fragments of text, wherein, for each second pair, a first multi-word fragment of text of the second pair is from a first text-based content item of the training data set and a second multi-word fragment of text of the second pair is from a second text-based content item of the training data set that is different than the first text-based content item; and training the transformer-based machine learning model based on the first pairs and the second pairs such that the transformer-based machine learning model generates a feature vector representative of a multi-word fragment of text provided as an input thereto.

17. The computer-readable storage medium of claim 16, wherein each of the first pairs are from within a same paragraph of the same text-based content item of the training data set.

18. The computer-readable storage medium of claim 16, wherein the summarization of the respective first text-based content item is further generated by:

providing a representation of each multi-word fragment of the second plurality of multi-word fragments as an input to the transformer-based machine learning model, the transformer-based machine learning model generating a feature vector representation for each multi-word fragment of the second plurality of multi-word fragments;

generating the similarity matrix to store, for each of the plurality of multi-word fragment pairs of the second plurality of multi-word fragments, a semantic similarity score representative of a semantic similarity between the multi-word fragment pair based on the feature vector representations generated for the multi-word fragment pair;

sorting the subset of multi-word fragments in an order in which each multi-word fragment of the subset of multi-word fragments appears in the respective first text-based content item; and wherein N is a positive integer.

19. The computer-readable storage medium of claim 18, wherein the semantic similarity score for a respective multi-word fragment pair of the second plurality of multi-word fragment pairs is based on a cosine similarity between the respective feature vectors representative of the respective multi-word fragment pair that are generated by the transformer-based machine learning model.

20. The computer-readable storage medium of claim 18, wherein the second feature vector representative of the summarization of the respective first text-based content item is generated by:

for each multi-word fragment of the sorted subset:

providing a representation of the multi-word fragment of the sorted subset as an input to the transformer-based machine learning model, the transformer-based machine learning model generating a feature vector representation of the multi-word fragment of the sorted subset; and combining each feature vector generated by the transformer-based machine learning model for the sorted subset to generate the second feature vector representative of the summarization of the respective first text-based content item.

* * * * *